UNITED STATES PATENT OFFICE.

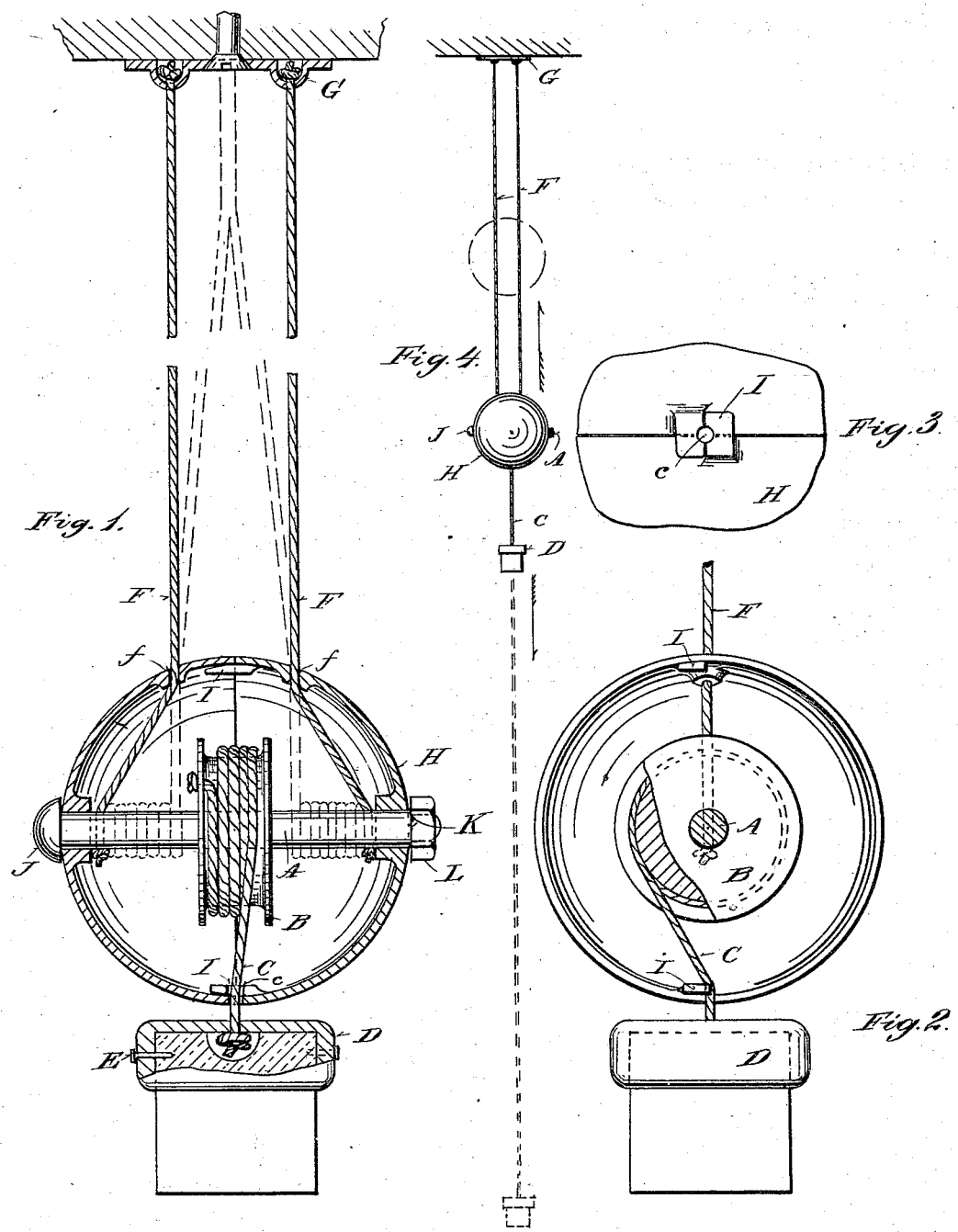

JOSEPH MENSE, OF BORDEAUX, FRANCE.

SELF-ACTING LUBRICATOR.

SPECIFICATION forming part of Letters Patent No. 455,570, dated July 7, 1891.

Application filed February 6, 1891. Serial No. 380,419. (No model.) Patented in France October 17, 1887, No. 186,375.

*To all whom it may concern:*

Be it known that I, JOSEPH MENSE, mechanician, of Bordeaux, Department of the Gironde, in the Republic of France, have invented certain new and useful Improvements in Self-Acting Lubricators, (for which I have obtained Letters Patent in France, October 17, 1887, No. 186,375, and Additional Patent June 4, 1889,) of which the following is a specification.

This invention relates to improvements in the lubricator for which I have obtained United States Letters Patent No. 394,497, on the 11th day of December, 1888.

The object of my invention is to provide an automatic lubricator which can be applied on all parts of machinery having either a rotary or a vertically or a horizontally reciprocating movement, which movement serves to shift the valve and causes the operation of the lubricator.

The invention consists in the construction and combination of parts and details, which will be fully described hereinafter, and finally pointed out in the claims.

In the accompanying drawings, Figure 1 is a vertical transverse sectional view of a lubricator adapted for parts of machinery that reciprocate vertically or rotate, and Fig. 2 is a similar view of my improved lubricator for parts of machinery having a horizontally-reciprocating movement.

Similar letters of reference indicate corresponding parts.

Referring to Fig. 1, A represents the oil-receptacle, into the head of which a metal piece B is screwed, which I have termed the "air-regulator." Said piece B is provided with a cylindrical recess B', provided in its top with an aperture E, through which the air can enter. In the said recess B' a cylindrical block D is placed, that is tapered off toward both ends. A cross-piece F prevents the block dropping out of the cylindrical recess B'. Into the bottom of the receptacle the guide-sleeve $a$ is screwed, which is provided at the top and bottom with seats for a double valve $b\ b'$, the valves $b\ b'$ being united by the stem $c$, provided with a longitudinal groove or recess $e$, to let the oil pass. $d$ represents the screw for holding valves on the stem. At the moment when the part to which the lubricator is attached arrives at the bottom of its stroke and begins to move upward, the valve is thrown upward, thus permitting a quantity of oil to pass from the receptacle through the groove or recess in the stem to the lower part of the stem. This quantity of oil is retained in the guide-sleeve $a$ as the lower valve $b'$ rests against its seat, when the upper valve is raised to let the oil pass. At the same time the block D is thrown upward and closes the aperture E, thus preventing the oil from being thrown out through the top aperture by the sudden reversing of the movement. The valve then descends, and the oil flows to the bearing, journal, &c.

In the construction shown in Fig. 2, A also represents the oil-receptacle, and E E the T-shaped channel for the admission of air. $a$ is a horizontal guide-valve, which is provided with valve-seats for the double valve $b\ b'$, the stem $c$ of which is also placed horizontally. As the machinery parts reciprocate horizontally the stem $c$ and the valves thereon are reciprocated horizontally, and the oil can pass from the chamber A into the compartment in which the valve $b$ works, then pass through the channel in the stem into the compartment in which the valve $b'$ is located, and then to the part of machinery that is to be lubricated. As no vertical movements take place there is no danger of throwing the oil through the top air-inlet.

Having thus described my invention, I claim as new and desire to secure by Letters Patent—

In a lubricator for movable parts of machinery, the combination, with a reservoir for receiving the lubricant, of a piece screwed in the head of the same and provided with a recess, the top of which communicates by an aperture with the outer air, a removable block confined in said recess, and of a double valve at the bottom of said receptacle, the stem connecting the valve being provided with a longitudinal groove or recess, substantially as set forth.

In testimony that I claim the foregoing as my own I have hereunto affixed my signature in presence of two witnesses.

JOSEPH MENSE. [L. S.]

Witnesses:
CH. PETER MEURILLE,
JOHN PRESTON BEECHER.